United States Patent

Murray et al.

[11] Patent Number: 5,104,771
[45] Date of Patent: Apr. 14, 1992

[54] OPTICAL COMPONENTS

[75] Inventors: Robert T. Murray, Helsby; Elizabeth J. Hodgkinson, Northwich, both of England

[73] Assignee: Imperial Chemical Industries PLC, London, England

[21] Appl. No.: 562,910

[22] Filed: Aug. 6, 1990

[30] Foreign Application Priority Data

Aug. 8, 1989 [GB] United Kingdom ............... 8918089
Apr. 4, 1990 [GB] United Kingdom ............... 9007580
Jul. 9, 1990 [GB] United Kingdom ............... 9015083

[51] Int. Cl.$^5$ ........................... G03C 5/16; G03C 5/00
[52] U.S. Cl. ................................... 430/290; 430/330; 430/321; 430/328
[58] Field of Search ................. 430/290, 1, 2, 321, 430/330, 328, 945

[56] References Cited

U.S. PATENT DOCUMENTS

| | | | |
|---|---|---|---|
| 3,993,485 | 11/1976 | Chandross et al. | 430/321 X |
| 4,240,849 | 12/1980 | Kurokawa et al. | 156/73.2 |
| 4,609,252 | 9/1986 | Wong et al. | 430/321 X |
| 4,942,102 | 7/1990 | Keys et al. | 430/2 X |

FOREIGN PATENT DOCUMENTS 0324493 7/1989 European Pat. Off. .

OTHER PUBLICATIONS

Kato et al., Electronics and Communications in Japan, vol. 65-C, No. 11 (1982).

Primary Examiner—Cynthia Hamilton
Attorney, Agent, or Firm—Cushman, Darby & Cushman

[57] ABSTRACT

An optical component of the integrated type is produced by coating a substrate (10) with a layer (12) of photo-polymerizable material which is substantially free of any thermal catalyst, exposing the layer to radiation at a first temperature via a mask for example so that zones of the layer are selectively polymerized in accordance with a predetermined pattern corresponding to the configuration of the desired optical component, heat treating the layer to post cure the polymerized zones, and thereafter flood illuminating the layer at a second temperature lower than the first to polymerize the previously unexposed areas. In this way, an enhanced refractive difference between the pattern and the surrounding areas can be achieved.

15 Claims, 2 Drawing Sheets

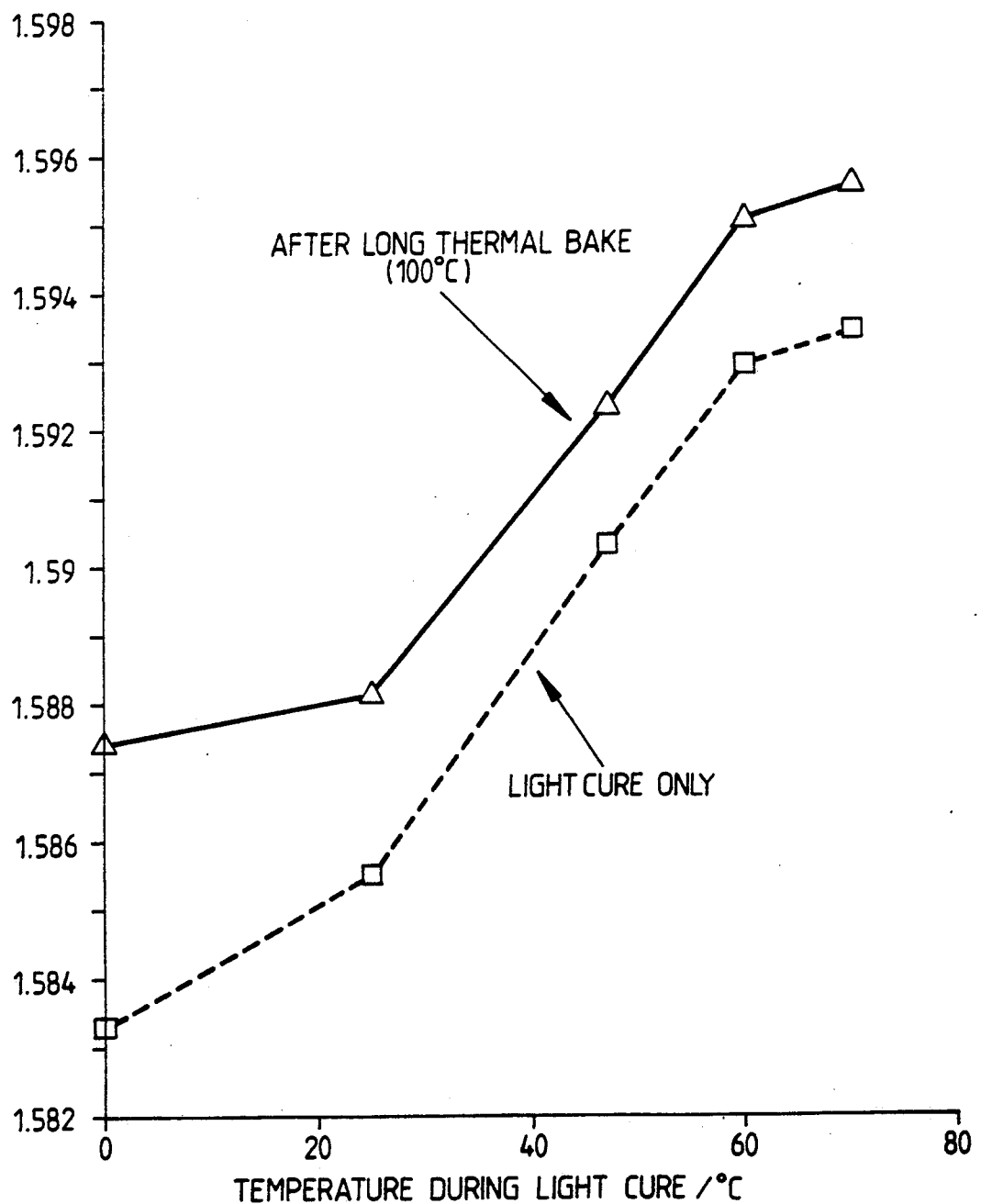

OPTICAL COMPONENTS

BACKGROUND OF THE INVENTION

This invention relates to optical components of the integrated type in which one or more optical paths is defined within a body of material. The optical path(s) may for example provide connections between optical fibres, the body of material incorporating such path(s) being adapted for connection to the fibres so as to align the fibres with the path(s).

Optical components of this type are well known and various methods for their manufacture have been devised -- see for example, the following articles appearing in Volume 104, "Micro-Optics" (1988) of the Proceedings of the International Society for Optical Engineering:

"Integrated optical refractive index sensor by ion-exchange in glass" by U. Hollenbach et al; "Command cure precision cements in optics" by R. T. Murray et al;

"Charge controlled ion exchange - a way to reproducible fabrication of integrated optical components in glass" by R. Klein et al;

"Birefringence of diffused lithium niobate Z-propogating waveguides depending on titanium concentration" by D. Eberhard;

"Optical guides in CR 39 irradiated by ion beams" by B. Bennamane et al; and

"Calculated and measured refractive index profiles of Kplus exchanged glass waveguides" by K. Spenner et al.

The Murray article for instance refers to the possibility of producing a multimode waveguide by a lithographic technique using a photo-curable resin. In practice, after the waveguide precursor has been produced by photo-etching into the resin, the remaining resin is washed away and the cured component can thereafter be encapsulated or buried in a polymer. This approach, involving photo-etching has the disadvantage that the the surfaces of the waveguide structure are microscopically rough with the consequence that light losses are inevitable at the sharp but rough boundary or interface between the waveguide and the polymer in which it is subsequently embedded thereafter.

It is known from U.S. Pat. No. 3,689,264 to produce light guides by selective irradiation of suitably sensitised samples with ultra violet light after the samples have been polymerised at a temperature below 100° C., irradiation being followed by ageing of the sample such that the refractive index of the irradiated region increases.

BRIEF SUMMARY OF THE INVENTION

The present invention seeks to provide an improved method for the production of optical components of the integrated type. According to one aspect of the present invention there is provided a method of making an optical component of the integrated type, said method comprising:

(a) forming a radiation-polymerisable composition as a layer;

(b) exposing a predetermined zone or zones of the layer to radiation to selectively polymerise those zones;

(c) heat-treating the layer at a temperature at which the zone(s) undergo further polymerisation while the remaining unexposed areas of the layer remain substantially unpolymerised by such heat treatment; and (d) exposing the layer to said radiation so as to cure the areas of said layer which surround the previously exposed zone(s).

According to a second aspect of the invention there is provided a method of making an optical component of the integrated type, said method comprising:

(a) forming a radiation-polymerisable composition as a layer;

(b) exposing a predetermined zone or zones of the layer to radiation to selectively polymerise those zones;

(c) heat-treating the layer at a temperature at which the zone(s) undergo further polymerisation while the remaining unexposed areas of the layer remain substantially unpolymerised by such heat treatment; and (d) exposing the layer to said radiation so as to cure the areas of said layer which surround the previously exposed zone(s); step (b) being carried out at a higher temperature than step (d).

As used herein, "light transmissive" and "light path" are not intended to be construed in a restricted sense, i.e. wavelengths lying outside the visible spectrum are not excluded, for example the optical components in question (as is well known in the art) may be used for the near infra red.

Typically, the product of the method of the invention, according to said first or second aspect, is an optical component of the integrated type comprising a layer composed of a light transmissive material which has been been polymerised by actinic and/or electron beam radiation and includes at least one light path extending through the layer, which light path is defined by a zone within the layer having a different degree of polymerisation to the surrounding material of the layer.

The effect of the differing degree of polymerisation is to impart to said zone(s) a different refractive index to that of the surrounding material so that the zone(s) can function as light waveguide means.

The interface between said zone(s) and the surrounding material may be of a diffuse nature in that the degree of polymerisation at the interface may change progressively to give a graded refractive index change and, hence, low scattering at the interface.

Where there is more than one light path, the light paths may be interconnected with one another, for example a single zone adjacent one edge of the layer (for connection to an input optical fibre) may branch into two or more of said zones which may terminate at another edge of the layer for connection to two or more output fibres. However, it is to be understood that the invention is not limited to any particular configuration of the light path(s) within the layer.

The layer is preferably provided on a substrate which may be rigid or flexible.

The photo-polymerisable composition is preferably coated onto a substrate before said selective exposure to the radiation. The substrate may comprise a plastics material having sufficient thermal stability to withstand the subsequent post-curing heat treatment. Alternatively, the substrate may comprise a ceramic material or may be composed of a single crystal; preferably however, where the substrate is rigid, it comprises a glass having a high transmissivity at the operating wavelength of the optical component. In some applications, the substrate may comprise a flexible or rigid printed circuit board, for example in applications combining optical and electronic components. Thus, for instance, the substrate, in addition to providing support for the optical component, may also act as a support for electronic components.

If desired, the substrate may be transmissive to the radiation employed for polymerising the photo-polymerisable composition and, in this event, exposure of the layer to said radiation may be effected via the substrate.

The substrate will normally be generally planar but we do not exclude the possibility that it may be of curved configuration in circumstances where the light is required to be transmitted along a curved path.

The said zones are conveniently exposed to actinic radiation (typically of wavelength in the range of about 300 to 500 nm). Exposure to the actinic radiation can be effected by means of a mask to limit exposure to said zones. Exposure may be implemented by means of laser-radiation; for example, the laser radiation may be projected as a beam which is controlled to "write" into the layer and follow a predetermined pattern to produce said predetermined zone(s) of polymerised material. Although we presently prefer to use actinic radiation, we do not exclude the possibility of using other forms of radiation, such as electron beam radiation, to effect selective polymerisation of the layer prior to effecting further polymerisation by thermal treatment. The term "radiation-polymerisable" as used in this specification is therefore to be construed accordingly.

A feature of the invention application is the selective exposure of said zones of the layer followed by further polymerisation of the exposed zones induced by thermal treatment. It is believed that the thermal treatment causes the exposed zone(s) to shrink relative to the surrounding areas with consequent increase of refractive index in such zone(s) relative to the surrounding areas. Also, it is believed that the photo-initiator, for example a free radical catalyst, activated selectively (e.g. to produce free radicals) by the initial exposure not only interacts within the zone(s) during the thermal treatment to produce further polymerisation but can also interact at the interface between said zone(s) and the surrounding areas to produce a polymerisation gradient between said zone(s) and the surrounding areas which is considered beneficial in terms of the optical performance of the light guiding zones.

The heat treatment step will in general be carried out at a temperature and for a timespan such that a refractive index mismatch of appropriate magnitude between said zone(s) and the surrounding areas is secured in the layer following the exposure of said surrounding areas. In practice, the temperatures and residence time used in the heat treatment process can be readily determined empirically.

The photo-polymerisable composition typically comprises a monomer and/or oligomer and an addition polymerisation catalyst such as a free radical catalyst. The composition is such that, following the steps of exposure to radiation and thermal treatment, the cured layer or at least said zone(s) is light transmissive. Also the composition is such that during the thermal treatment step, only those zones which have been exposed to radiation undergo further polymerisation, i.e. the remaining areas of the layer do not undergo any significant degree of polymerisation during the thermal treatment step. The invention can be practised using a wide range of monomers and oligomers that are conventionally used in photo-polymerisable compositions. For example, the composition may be an oligomeric aromatic methacrylate which may be combined with a photo-initiator system providing free radicals in the presence of blue light.

By cooling the layer prior to step (d) so that the exposure in step (d) is carried out at a lower temperature than step (b), it has been found that a more pronounced difference in refractive index can be achieved between said zone(s) and the surrounding areas. Usually the radiation treatment carried out in step (d) will polymerise the surrounding areas to the extent necessary for many applications.

Preferably the layer is cooled to a temperature less than that at which step (b) is carried out, steps (b) and (d) preferably being carried out at temperatures which differ by at least 20° C., more preferably by at least 40° C. and most preferably by at least 50° C.

Step (b) may be carried out at an elevated temperature, e.g. at least 30° C. (more preferably at least 40° C.), and typically, prior to step (d), the layer will be cooled to a temperature of about 20° C. or below. Depending on the nature of the polymerisable material, prior to step (d), the layer may be cooled to a temperature below 10° C. or lower, e.g. within the range −10° C. to +5° C.

Prior to step (b), the layer may be laminated with a sheet of material which is transmissive to said radiation and step (b) is carried out by irradiating the layer through said transmissive sheet. The sheet is preferably impermeable so that when the layer is sandwiched between a substrate and the laminated sheet, air is substantially excluded. The provision of a laminated sheet may affect the nature of the material shrinkage that occurs during the steps of the process of the invention in that the shrinkage may, at least to some extent, be constrained in a direction generally perpendicular to the plane of the interface between the layer and the laminating sheet. In other words, the shrinkage may tend to take place in planes transverse to said generally perpendicular direction.

Step (d) may also be carried out by irradiating the layer through said transmissive sheet.

In some circumstances however, for instance where the end product is to be used in applications where it may be vulnerable to solvent attack, step (d) may be supplemented with a further thermal treatment to effect post-curing but in such a way that a substantial refractive index difference is retained, e.g. by carrying out the second thermal treatment at a lower temperature than that of step (c) and/or for a shorter duration.

BRIEF DESCRIPTION OF DRAWING

To promote further understanding of the invention, one embodiment thereof will now be described by way of example only with reference to the accompanying drawings, in which:

FIG. 3 is a graph illustrating variation of refractive index with temperature at which light curing is effected.

DETAILED SUMMARY OF INVENTION

Figure 1:
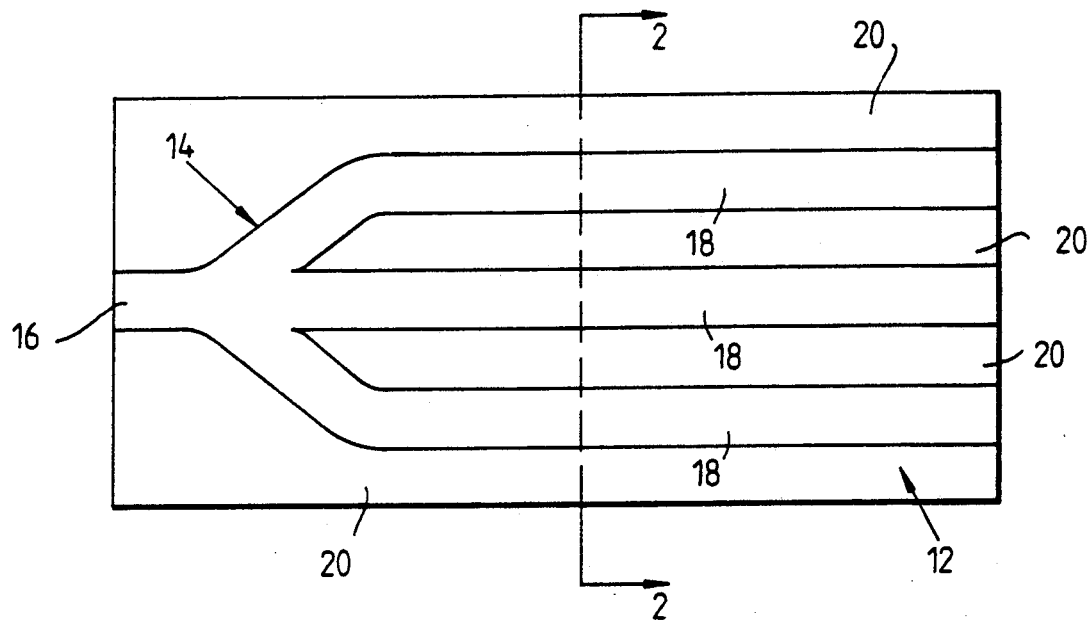
FIG. 1 is a schematic plan view of an optical waveguide precursor following selective polymerisation of a photo-polymerisable composition coated as a layer onto a substrate.
Figure 2:
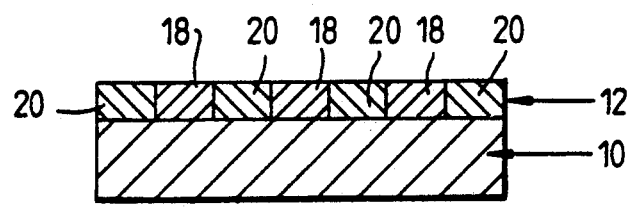
FIG. 2 is cross-sectional view taken in the direction 2—2 in FIG. 1.

Referring to the drawings, the micro-optical assembly shown comprises a substrate 10, e.g. glass, and a superposed layer 12 which incorporates, as an integral part of the layer, a waveguide structure 14. In the illustrated embodiment, the structure 14 comprises an input section 16 at one edge of the layer 12 for connection to an optical fibre by means not shown, and branched sections 18 which terminate at a second edge or edges of the layer 12 for connection to separate optical fibres by unshown means. The structure 14 is an integral part of the layer in the sense that it is formed by selective photopolymerisation of the same continuous coating as the surrounding parts 20. In other words, the material constituting the remaining parts 20 is not deposited as a separate step from the deposition of the material constituting the structure 14.

The assembly is fabricated as follows. Firstly, a liquid photo-polymerisable composition is coated on to one face of the substrate 10 to form a liquid or semi-liquid layer which is of substantially uniform thickness. The composition may, for example, comprise a methacrylate resin (which, when cured, will be transparent to the wavelength of light to be transmitted by the waveguide structure) and a free radical photo-initiator. The coated layer is then heated, for example with the aid of a water bath, to a temperature of the order of say 60° to 100° C. and at that temperature is subjected to selective photo-polymerisation in accordance with the configuration of the component to be produced. This may be effected by means of a mask or stencil carrying the desired pattern and illuminating the coated layer through the mask or stencil, e.g. to reproduce the waveguide structure shown in FIG. 1. Alternatively, the pattern may be produced by a technique involving the use of a laser beam, e.g. laser-writing into the coated layer. At this stage, the exposed zones will be in a solid phase and the surrounding parts 20 remain substantially unpolymerised and in a liquid or semi-liquid phase.

The assembly is next placed in an oven to effect post-curing or further polymerisation of the previously polymerised zones. The thermal treatment carried out at this stage is believed to mobilise the free radicals generated during the initial polymerisation step to cause further polymerisation within the previously polymerised zones and also to cause some degree of polymerisation, to a limited extent, beyond those zones. The thermal treatment is carried out at a temperature and for a time interval such that the remaining parts 20 of the layer are substantially unaffected in terms of polymerisation and remain in a liquid or semi-liquid state. The temperature at which the thermal treatment is carried out is selected to be greater than the glass transition temperature of the polymerised zones. The photo-polymerisable composition may for instance exclude a thermal catalyst so that the remaining parts 20 do not undergo any significant polymerisation during the thermal treatment. At this stage, therefore, the coated layer will consist of post-cured zones surrounded by areas which are substantially unpolymerised.

Next, the entire layer is flooded with light to substantially fully polymerise the surrounding previously unpolymerised areas and convert them to a solid phase. However, in accordance with present invention, the layer is first cooled to a temperature which is somewhat less than that at which the selective photo-polymerisation was carried out, for example about 0° to 20° C. and only then is it flooded with light so that the resulting polymerisation is carried out with the layer at a reduced temperature. The effect of selectively photo-polymerising and post-curing specific zones of the layer, coupled with pre-cooling prior to the final flood illumination, is to produce an increased refractive index difference between those zones and the surrounding areas and it is believed that the limited polymerisation that can occur beyond those zones during the post-curing step can give rise to a refractive index gradient in the regions of the interfaces between the photo-polymerised and post-cured zones and the surrounding areas.

In order to illustrate the effect of carrying out the radiation at different temperatures and post-curing, the graph of FIG. 3 was derived by subjecting samples of a light-curing resin to irradiation at different temperatures and subsequent baking. Each sample was allowed to equilibrate at the temperature at which light curing was to be carried out by placing it in a water bath at the desired temperature. The sample was then irradiated with light for an interval of about 300 seconds and the refractive index was measured (see points depicted by squares in FIG. 3). The sample was then removed from the water bath and subjected to baking at a temperature of the order of 100° C. for several hours, after which the modified refractive index of the sample was measured (see points depicted by triangles in FIG. 3).

It will be seen from FIG. 3 that the refractive index of a sample subjected to irradiation is dependent on the temperature at which the sample was irradiated. Also when a given sample is subsequently baked, its refractive index is enhanced.

FIG. 3 illustrates that a substantial refractive index difference between different zones of a layer can be obtained if selective radiation and flood illumination are carried out a different temperatures, i.e. such that the selective radiation is carried out a temperature substantially higher than that at which the flood irradiation is carried out.

Although the invention is described above in relation to a particular form of micro-optical component, it will be appreciated that the invention has application to the fabrication of other forms of micro-optical components.

EXAMPLE

A composition comprising a mixture of 2 parts of an oligomeric methacrylate light curing resin and 1 part toluene by weight was spin coated on to a glass substrate rotating at a speed of about 750 rpm for 1 minute. The light curing resin comprised:

91 pbw diphenyl ether methacrylate resin
9 pbw triethylene glycol dimethacrylate
0.75 pbw camphorquinone
0.75 pbw dimethylaminoethyl methacrylate
0.05 pbw 4-methoxyphenol (pbw=parts by weight)

The resin was produced by the method described with reference to Examples 14-16 of European Patent No. 112650B using components in the following molar ratios:

| | |
|---|---|
| diphenyl oxide | 1 |
| formaldehyde | 4.1 |
| sulphuric acid | 8.6 |
| water | 25.1 |
| methacrylic acid | 13.0 |

The reaction temperature was 60°-65° C.

The coated substrate was then laminated with a 12 micron thick, light transmissive film of MELINEX "S" grade polyethylene terephthalate (MELINEX is a Registered Trade Mark of Imperial Chemical Industries PLC) with the resin coating sandwiched between the glass substrate and the laminating film. The laminated structure was then heated at about 100° C. in an oven for about 15 minutes, taken from the oven while still at this temperature and exposed selectively for 2 minutes to collimated light via a mask providing a pattern of stripes, each 65 micron wide and separated from one another by a spacing of 65 micron. The light source used provided an output of 0.1 Watts $cm^{-2}$ within the wavelength range 462-478 nm.

The coated substrate was then thermally baked in an oven at a temperature of about 100° C. for a period of time in excess of 15 minutes. It was then removed from the oven, cooled to about 20° C. and flood illuminated with light from a white light source giving an output of 270 mW $cm^{-2}$. The resulting product was examined using phase contrast microscopy and was found to exhibit clearly distinguishable stripes corresponding to the pattern. The fact that the stripes could be distinguished in this way, using phase contrast microscopy, indicates the presence of refractive index differences between the selectively exposed zones and the flood illuminated surrounding areas.

We claim:

1. A method of making an optical component of the integrated type, said method comprising:
   (a) forming a radiation-polymerisable composition as a layer;
   (b) exposing a predetermined zone or zones of the layer to radiation to selectively polymerise those zones;
   (c) heat-treating the layer at a temperature at which the zone(s) undergo further polymerisation while the remaining unexposed areas of the layer remain substantially unpolymerised by such heat treatment; and
   (d) exposing the layer to said radiation so as to cure the areas of said layer which surround the previously exposed zone(s); step (b) being carried out at a higher temperature than step (d).

2. A method as claimed in claim 1 in which the radiation-polymerisable composition is formed as a layer on a substrate.

3. A method as claimed in claim 1 in which step (b) is carried out by exposing the layer to radiation via a mask so that the layer is irradiated with a pattern corresponding to the configuration of the desired optical component.

4. A method as claimed in claim 1 in which step (b) is carried out by exposing the layer to radiation by means of a laser beam and controlling the laser beam to write into the layer and follow a predetermined pattern to produce said predetermined zone(s) of polymerised material.

5. A method as claimed in claim 1 in which, prior to step (d), the layer is cooled to a temperature less than that at which step (b) is carried out.

6. A method as claimed in claim 1 in which steps (b) and (d) are carried out at temperatures which differ by at least 20° C.

7. A method as claimed in claim 1 in which steps (b) and (d) are carried out at temperatures which differ by at least 40° C.

8. A method as claimed in claim 1 in which steps (b) and (d) are carried out at temperatures which differ by at least 50° C.

9. A method as claimed in claim 1 in which, prior to step (d), the layer is cooled to a temperature below 25° C.

10. A method as claimed in claim 1 in which, prior to step (d), the layer is cooled to a temperature below 10° C.

11. A method as claimed in claim 1 in which, prior to step (d), the layer is cooled to a temperature within the range $-10°$ C. to $+5°$ C.

12. A method as claimed in claim 1 in which, prior to step (b), the layer is laminated with a sheet of material which is transmissive to said radiation and step (b) is carried out by irradiating the layer through said transmissive sheet.

13. A method as claimed in claim 12 in which step (d) is carried out by irradiating the layer through said transmissive sheet.

14. A method as claimed claim 1 in which said polymerisable composition is substantially free of any thermal catalyst.

15. A method as claimed in claim 1 in which step (d) is followed by the step of thermally treating the layer at a lower temperature than that used in step (c).

* * * * *